Dec. 25, 1928.

D. LARKIN 1,696,207

PIPE FITTING

Filed March 13, 1925

Inventor:
David Larkin,
By Hugh K. Wagner,
Attorney

Patented Dec. 25, 1928.

1,696,207

UNITED STATES PATENT OFFICE.

DAVID LARKIN, OF ST. LOUIS, MISSOURI.

PIPE FITTING.

Application filed March 13, 1925. Serial No. 15,377.

This invention relates in general to pipe fittings, and more particularly to a special fitting for supporting spray nozzles in tanks and the like. Such spray nozzles are usually arranged on the interior of the tank, and are connected to a system of piping disposed exteriorly of the tank, the fitting or spray nozzle holder intermediating the spray nozzle and the system of piping and being adapted to pass through an opening therefor in a side of the tank in a tightly fitting manner.

The object of the present invention is to provide a fitting of the character described which will permit the ready removal or insertion of the spray nozzle or the like from the tank for the purpose of inspection and repairs without having to disturb or disarrange the system of piping supplying the same.

In the accompanying drawings forming part of this specification, in which like numbers of reference denotes like parts wherever they occur, Figure 1 is a plan view of a fitting made in accordance with this invention;

Figure 1:
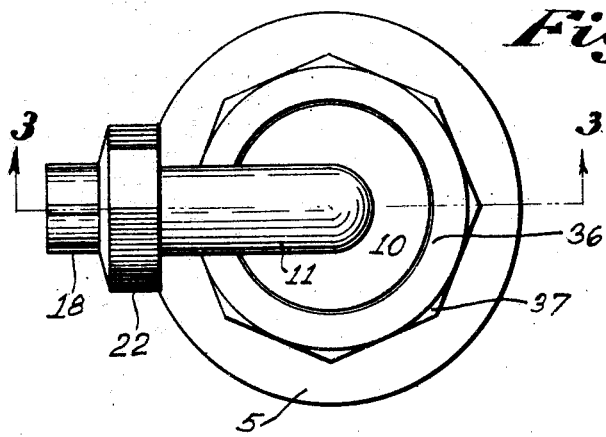
Figure 2:
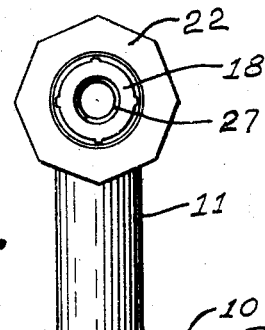
Figure 2 is an end elevation thereof.
Figure 3:
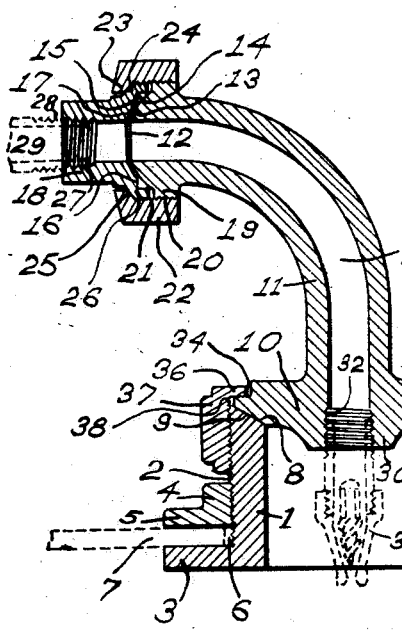
Figure 3 is a sectional view taken on the line 3—3 in Figure 1, the spray nozzle and a portion of the tank and system of piping associated therewith being indicated in dotted lines.
Figure 3:
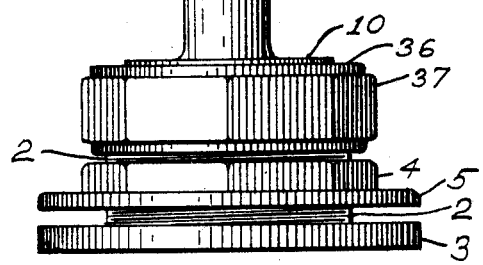

The fitting comprises a tubular body 1, externally screw-threaded at 2, and having a radially extending flange 3 at its inner end. A nut 4 fits the screw-thread 2 on the body 1, and enlarges at its inner end into a radially extending flange 5. Body 1 passes through an opening 6 therefor in the tank wall 7, the flange 3 bearing against the inner side of the wall 7 when the nut 4 is screwed home against the outer side of the wall 7.

The outer end of the tubular body 1 terminates in an inclined seat 8, preferably conically shaped, to receive the co-acting seat 9, preferably also conical in form of the flange 10, extending radially from the inner end of the intermediate hollow connecting element, preferably in the form of an elbow fitting 11, the outer end 12 of which terminates in a preferably spherically ground convex surface 13, which co-operates with the preferably concave spherical surface 14 of a packing ring 15, located in an annular seat 16 in the inner end surface 17 of a hollow stem 18.

A flange 19 extends radially from fitting 11 immediately below the base of the surface 13, and is externally screw-threaded on its peripheral surface 20, to fit internal screw-threads 21 of clamping ring or nut 22, provided with an inwardly extending flange 23, whose preferably concave spherically-shaped inner side 24 is adapted to fit against the convex side 25 of outwardly extending flange 26 formed on the inner end of stem 18. Stem 18 is internally screw-threaded at 27 to fit suitable threads 28 formed on the elements of the piping system 29. A boss 30 projects from the lower face of the flange 10; and the passage 31 extends through the connector 11 from the surface 13 through the boss 30, its terminating portion 32 at the latter being internally screw-threaded to receive the externally screw-threaded spray nozzle 33, which may be of any suitable or common type. An annular peripheral recess 34 is machined or faced in the upper side of the flange 10 to provide a finished shoulder 35, adapted to be engaged by an inwardly extending flange 36, formed on a clamping ring 37, internally screw-threaded at 38 to fit thread 2 of the sleeve 1.

Should the removal of the spray nozzle 33 become necessary for any reason, as for inspection, repairs, cleaning, or replacement purposes, it is merely necessary to unscrew ring 37 from sleeve 1 and ring 22 from flange 19, whereupon fitting 11 and its associated spray nozzle 33 and ring 37 may be withdrawn from body 1 and stem 18 without disturbing or displacing the piping system 29 or the tank. The surfaces of the flanges 3 and 5 engaging the tank wall 7, and the surfaces 8 and 9 are preferably finished or machined, instead of being permitted to remain rough.

Having thus fully described this invention, I hereby reserve the benefit of all changes in form, arrangement, order, or use of parts, as it is evident that many minor changes may be made therein without departing from the spirit of this invention or the scope of the following claim.

I claim:

A pipe fitting structure of the class described comprising a flanged tubular member adapted for engagement with an apertured wall and terminating in an inclined seat portion, an elbow pipe provided at one end with a circumferential flange having a marginal inclined seat adapted to co-act with said inclined seat portion, the other end of said elbow pipe being adapted for removable connection with a pipe line, a boss projecting from the lower face of said circumferential flange and surrounding a centrally disposed threaded outlet somewhat smaller than the internal diameter of said tubular member and adapted to receive a projecting nozzle centrally spaced within said member, and means for clamping said tubular member to said elbow pipe.

In testimony whereof I hereunto affix my signature.

DAVID LARKIN.